United States Patent
Cherian et al.

(10) Patent No.: US 7,478,177 B2
(45) Date of Patent: Jan. 13, 2009

(54) SYSTEM AND METHOD FOR AUTOMATIC REASSIGNMENT OF SHARED STORAGE ON BLADE REPLACEMENT

(75) Inventors: Jacob Cherian, Austin, TX (US); Nam V. Nguyen, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 159 days.

(21) Appl. No.: 11/460,681

(22) Filed: Jul. 28, 2006

(65) Prior Publication Data

US 2008/0028107 A1 Jan. 31, 2008

(51) Int. Cl.
*G06F 3/00* (2006.01)

(52) U.S. Cl. .................. 710/9; 710/8; 710/10; 710/36; 710/74

(58) Field of Classification Search ............... 710/8–10, 710/36, 74
See application file for complete search history.

(56) References Cited

U.S. PATENT DOCUMENTS

| | | | |
|---|---|---|---|
| 5,758,170 A | 5/1998 | Woodward et al. .......... 395/740 |
| 6,078,979 A | 6/2000 | Li et al. ...................... 710/129 |
| 6,351,375 B1 | 2/2002 | Hsieh et al. .................. 361/685 |
| 6,393,539 B1 | 5/2002 | Nguyen et al. ............. 711/164 |
| 6,487,613 B1 | 11/2002 | Nguyen et al. ................. 710/15 |
| 6,532,500 B1 | 3/2003 | Li et al. .......................... 710/15 |
| 6,564,252 B1 | 5/2003 | Hickman et al. ............. 709/214 |
| 6,578,099 B1 | 6/2003 | Bassman et al. ............. 710/301 |
| 6,606,630 B1 * | 8/2003 | Gunlock ...................... 707/100 |
| 6,609,213 B1 | 8/2003 | Nguyen et al. ................. 714/4 |
| 6,622,163 B1 | 9/2003 | Tawill et al. ................. 709/211 |
| 6,754,817 B2 | 6/2004 | Khatri et al. ................... 713/1 |
| 6,874,060 B2 | 3/2005 | Blood et al. ................. 711/111 |
| 6,877,042 B2 | 4/2005 | Tawil et al. .................. 709/250 |
| 6,941,357 B2 | 9/2005 | Nguyen et al. .............. 709/220 |
| 6,990,573 B2 | 1/2006 | Cherian et al. .................. 713/1 |
| 7,003,617 B2 | 2/2006 | Golasky et al. ............. 710/315 |
| 7,035,955 B2 | 4/2006 | Bobbitt et al. .............. 710/305 |
| 7,093,048 B2 | 8/2006 | Bobbitt et al. .............. 710/302 |
| 2002/0087727 A1 | 7/2002 | Tawil et al. .................. 709/245 |
| 2003/0120743 A1 | 6/2003 | Coatney et al. ............. 709/217 |
| 2003/0172331 A1 | 9/2003 | Cherian et al. .............. 714/712 |
| 2004/0153639 A1 | 8/2004 | Cherian et al. .................. 713/2 |
| 2005/0091449 A1 | 4/2005 | Cherian ...................... 711/114 |
| 2005/0188239 A1 | 8/2005 | Golasky et al. ................ 714/2 |
| 2006/0018505 A1 | 1/2006 | Cherian et al. .............. 382/100 |

(Continued)

*Primary Examiner*—Tammara Peyton
(74) *Attorney, Agent, or Firm*—Hamilton & Terrile, LLP; Gary W. Hamilton

(57) ABSTRACT

A system and method is disclosed for the automatic assignment, or reassignment, of shared storage resources to blade computers in a blade server environment. A chassis manager is implemented as a processing entity on the mid-plane of a blade server chassis to provide, independently or in conjunction with other systems and/or attached storage devices, management of shared storage resources. Management of these resources includes, but is not limited to, creation of logical units, assignment of logical units to predetermined blade server chassis slots, and deletion of logical units. Host-based software is not required to assign shared resources to a computer blade, only its presence in a predetermined slot of a blade server chassis. Logical unit numbers (LUNs) are assigned by the chassis manager based on blade server slot IDs while host-unique identifiers, such as world wide names (WWNs) are used by one or more shared storage controllers for internal LUN addressing.

20 Claims, 5 Drawing Sheets

U.S. PATENT DOCUMENTS

| | | | |
|---|---|---|---|
| 2006/0041793 A1 | 2/2006 | Cherian et al. | 714/47 |
| 2006/0101171 A1* | 5/2006 | Grieff et al. | 710/36 |
| 2006/0112302 A1 | 5/2006 | Cherian | 714/6 |
| 2006/0143505 A1 | 6/2006 | Olarig et al. | 714/6 |
| 2006/0156055 A1 | 7/2006 | Cherian et al. | 714/4 |
| 2006/0218436 A1 | 9/2006 | Cherian et al. | 714/6 |
| 2007/0162592 A1* | 7/2007 | Marks et al. | 709/224 |

* cited by examiner

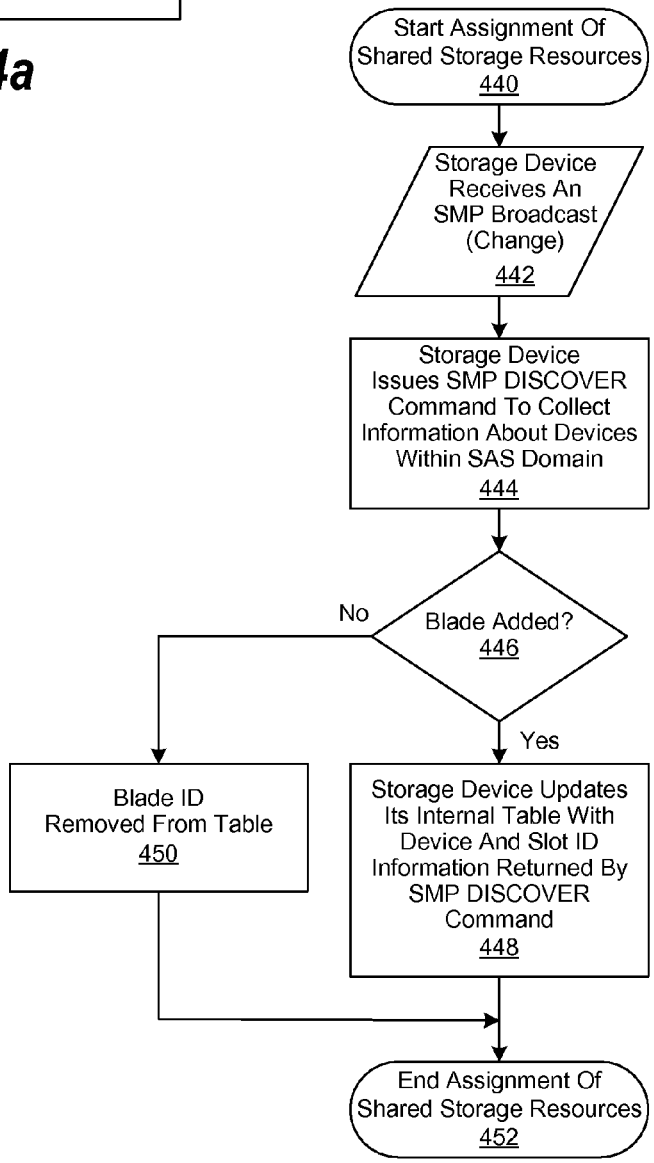
FIGURE 4a
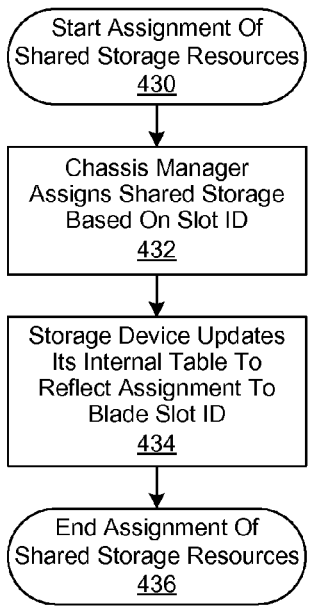
FIGURE 4b
FIGURE 4c

SYSTEM AND METHOD FOR AUTOMATIC REASSIGNMENT OF SHARED STORAGE ON BLADE REPLACEMENT

BACKGROUND OF THE INVENTION

1. Field of the Invention

The present invention relates in general to the field of information handling systems, and more specifically, to managing assignment of shared storage resources in a blade server environment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The amount of data information handling systems manage continues to grow, driving the need for scalable systems that not only sustain information integrity and availability, but also make efficient use of computing resources. A popular approach to addressing this need is the use of blade servers, which generally comprise a number of individual computer blades housed within a chassis that provides a common power supply, cooling, and management resources. Each computer blade typically includes one or more processors, computer memory, network connections, and computer storage. An advantage to this approach is that users, applications and/or processes can be assigned to specific computer blades and/or spread across available resources. As additional processing power or capacity is needed, additional computer blades are added to the blade server.

However, the amount of computer storage available for each blade is generally constrained by the number and capacity of the disk drives it can physically accommodate. While some systems allow blades to share each other's disk resources, it has become common to have a consolidated data storage unit that combines disk and other storage resources to service multiple blades comprising one or more blade servers. These consolidated data storage units are typically implemented as a redundant array of independent disks (RAID) subsystem, which can share and/or replicate data across multiple disk drives, any of which can typically be replaced (i.e., hot swapped) while the system is running. The RAID subsystem may be externally implemented, coupled by a high-speed interconnect to the blade server, or internally implemented as a storage blade that shares the mid-plane of the blade server with computer blades. Regardless of its physical implementation, it is common practice to partition storage resources comprising the RAID subsystem through the use of logical unit number (LUN) masking, such that storage allocated to one blade or server is not visible or available to others.

Current methods of assigning LUNs that utilize host-unique identifiers can present certain disadvantages, especially in a blade environment. For example, before shared storage resources can be assigned to a computer blade, it must first be installed in a corresponding blade server and be implemented with appropriate host software. As another example, storage resources assigned to a failed computer blade will not be accessible by the replacement blade until the storage controller is reconfigured to recognize the blade's unique host identifier. In view of the foregoing, there is a need for shared storage resources to be automatically assigned, or reassigned, to blade computers in a blade server environment.

SUMMARY OF THE INVENTION

In accordance with the present invention, a system and method is disclosed for the automatic assignment, or reassignment, of shared storage resources to blade computers in a blade server environment. In different embodiments of the invention, a chassis manager is implemented to enable the assignment of logical unit numbers (LUNs) based on blade server slot IDs while host-unique identifiers, such as server-attached storage (SAS) addresses or world wide names (WWNs), are used by one or more shared storage controllers for internal LUN addressing. As implemented in some embodiments of the invention, the chassis manager is a processing entity implemented on the mid-plane of the blade chassis that provides, independently or in conjunction with other systems and/or attached storage devices, management of shared storage resources. Management of these resources includes, but is not limited to, creation of logical units, assignment of logical units to predetermined blade server chassis slots, and deletion of logical units. Management commands are communicated via an interface (e.g., Ethernet, serial port, etc.) implemented on the chassis manager itself, or by mapping the chassis manager onto a predetermined computer blade that is coupled to the blade server's mid-plane such that its functionality can be accessed through the blade.

In an embodiment of the invention, a chassis manager is implemented on the mid-plane of a blade server chassis comprising a serial-attached small computer system interface (SAS), further comprising one or more SAS expanders that provide connectivity between the computer blades of the blade server and shared storage resources likewise supporting the SAS protocol. The location of each computer blade, defined as the point at which the blade connects to the SAS interconnect, is identified by the unique WWN or SAS address of the SAS expander and its phy identifier. The chassis manager is coupled to the expander such that it can access the SAS address information for the expander(s) that the blades are associated with. In an embodiment of the invention, blade-slot-to-phy address information is pre-set using a hardware method. In another embodiment of the invention, the chassis manager retrieves blade-slot-to-phy address information for predetermined models of blade server chassis from non-volatile storage.

In an embodiment of the invention, an SAS storage controller is configured such that each logical unit is assigned to a predetermined slot of a blade server chassis. When a host computer blade is implemented on a slot on the mid-plane of the blade server chassis, a Serial Management Protocol (SMP) BROADCAST (CHANGE) is generated, notifying all devices in the associated SAS domain of the blade's presence.

When a storage device receives the SMP BROADCAST (CHANGE) notification, it executes an SMP DISCOVER command to detect the unique WWN identifier of the computer blade that initiated the notification and the slot of the blade server chassis it occupies. The detected blade computer's WWN identifier, and its associated blade server chassis slot information, is then used by the storage device assign shared storage resources to the slot and to prevent other computer blades from viewing or accessing the assigned resources. In another embodiment of the invention, when the chassis manager receives a BROADCAST (CHANGE) notification, it queries the address of each slot in the blade server chassis to get the WWN identifier of its associated blade computer. If a new WWN identifier is detected, the chassis manager sends a vendor-specific Small Computer System Interface (SCSI) command to the SAS storage controller such that shared storage resources are reassigned to the new blade computer. It will be apparent to those of skill in the art that in these embodiments of the invention shared storage resources are assigned to predetermined blade server slot addresses, not to a blade computer's unique WWN identifier. Furthermore, no host-based software is required to assign shared resources to a computer blade, only its presence in a predetermined slot of a blade server chassis. It will likewise be apparent to skilled practitioners of the art that the method and system of the invention can be implemented using other storage interconnect protocols that provide address-to-interconnect points. For example, when implemented with the Fibre Channel protocol, the chassis manager detects implementation of a computer blade through a Fibre Channel port with a registered state change notification (RSCN) from the Fibre Channel fabric and then executes processes similar to those described in greater detail herein. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a-c depict shared storage resource masking information maintained by one or more storage devices as implemented in accordance with an embodiment of the invention.

DETAILED DESCRIPTION

A system and method is disclosed for the automatic assignment, or reassignment, of shared storage resources to blade computers in a blade server environment. In different embodiments of the invention, a chassis manager is implemented to enable the assignment of LUNs based on blade server slot IDs while host-unique identifiers (e.g., SAS addresses or WWNs) are used by one or more shared storage controllers for internal LUN addressing.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
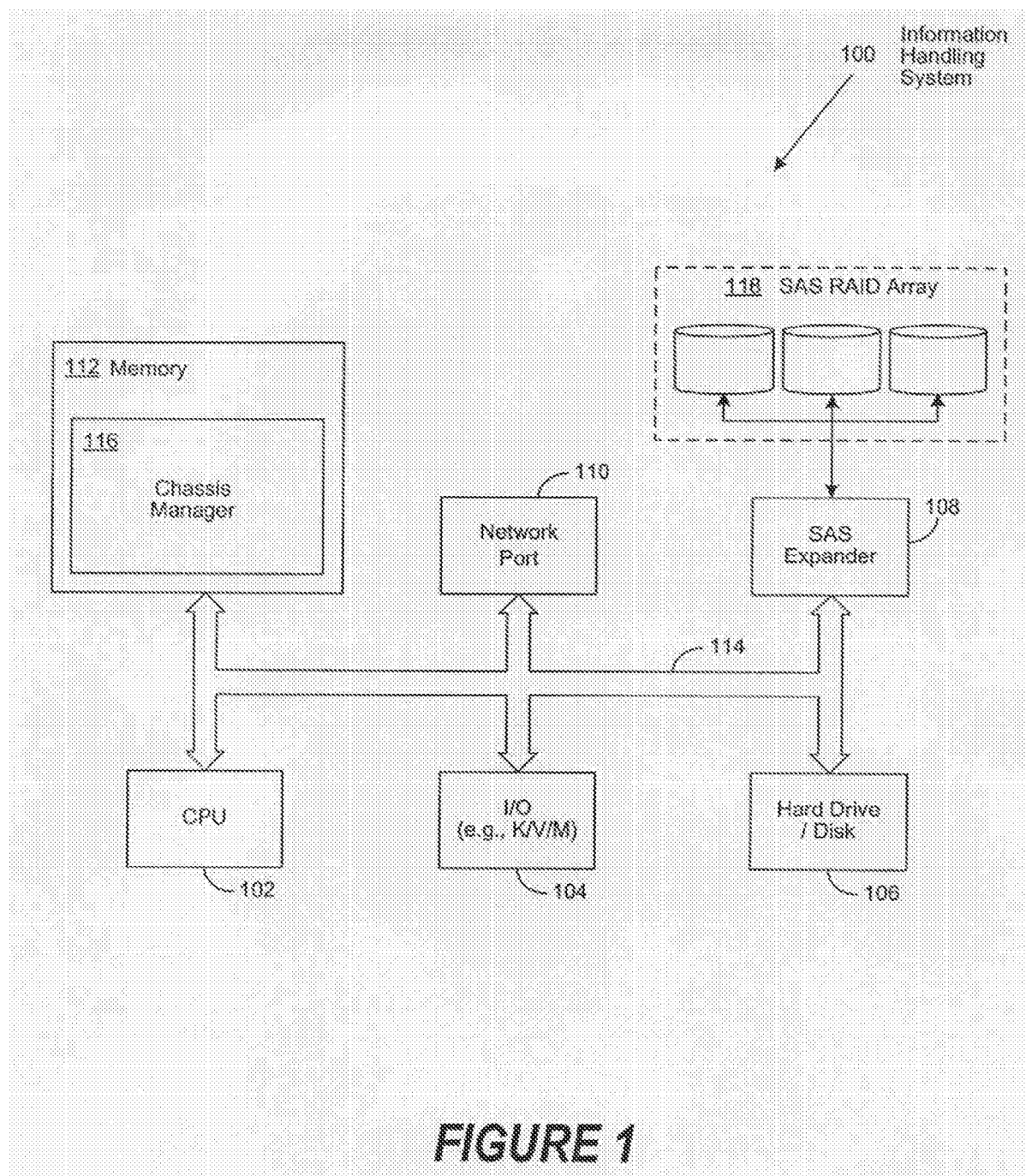
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, serial-attached small computer system interface (SAS) expander 108 operable to manage shared storage resources comprising SAS RAID Array 118, network port 110, and system memory 112, all interconnected via one or more buses 114. System memory 112 comprises chassis manager 116 which is utilized in an embodiment of the invention for automatically assigning, or reassigning, shared storage resources comprising SAS RAID array 118 to predetermined slots comprising a blade server chassis.

Figure 2:
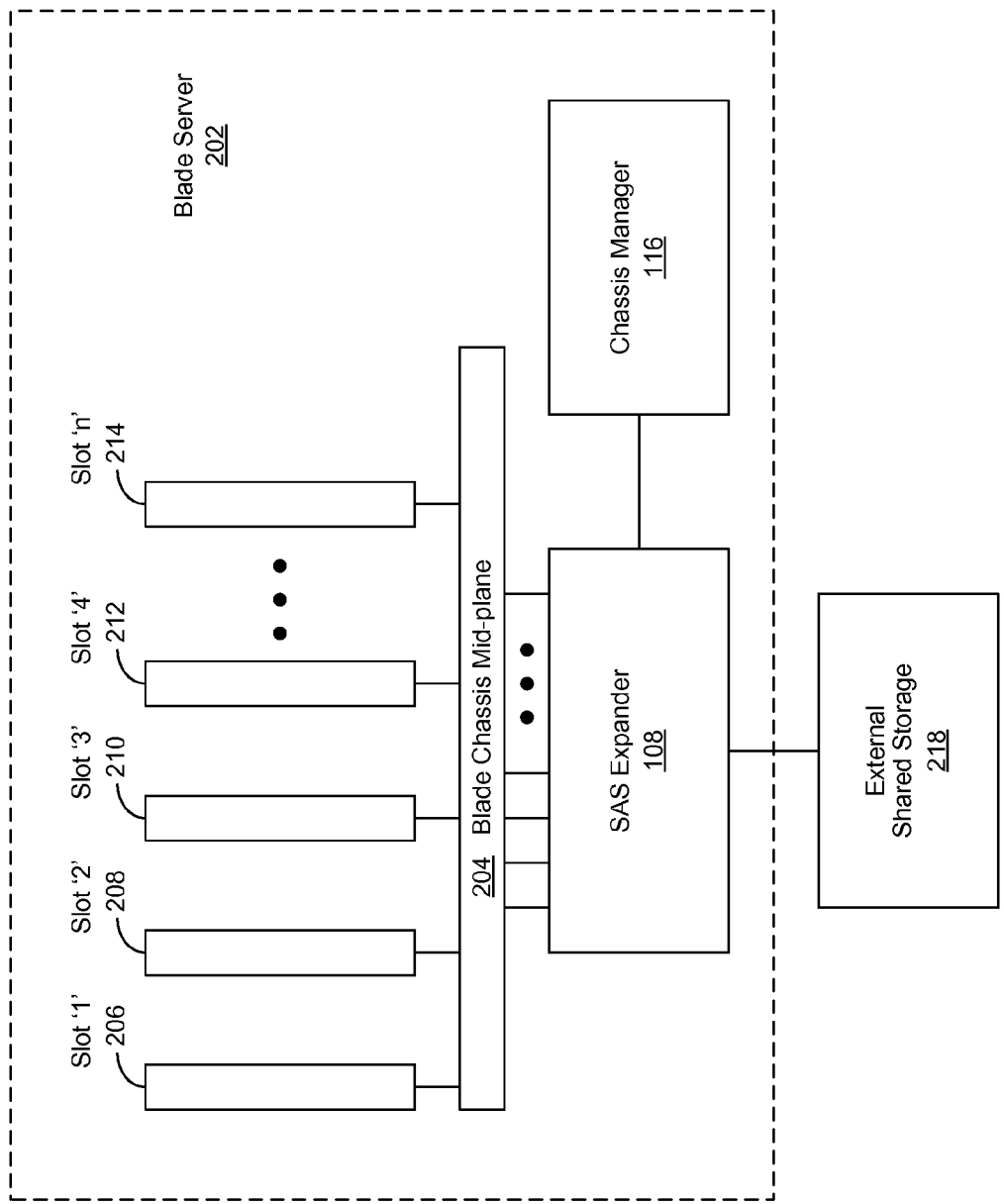
FIG. 2 is a generalized block diagram of a blade server implemented with external shared storage in accordance with an embodiment of the invention.

FIG. 2 is a generalized block diagram of a blade server 202 implemented with external shared storage 218 in accordance with an embodiment of the invention. Blade server 202 comprises blade chassis mid-plane 204, blade server chassis slots '1' 206, '2' 208, '3' 210, '4' 212 through 'n' 214, serial-attached small computer system interface (SAS) expander 108 and chassis manager 116. Blade chassis mid-plane 204 transfers data, distributes power, and provides signal connectivity to couple one or more blade computers implemented on blade server chassis slots '1' 206, '2' 208, '3' 210, '4' 212 through 'n' 214, to SAS expander 108.

As implemented in various embodiments of the invention, chassis manager 116 is a processing entity implemented on blade chassis mid-plane 204 to provide management of external shared storage resources 218. The chassis manager can be implemented independently or in conjunction with other systems (e.g., SAS expander 108) and/or attached storage devices. In an embodiment of the invention, external shared storage resources 218 comprise a redundant array of independent disks (RAID) subsystem. Management of these resources includes, but is not limited to, creation of logical units, assignment of logical units to predetermined blade server chassis slots '1' 206, '2' 208, '3' 210, '4' 212 through 'n' 214, and deletion of logical units. Management commands are communicated via an interface (e.g., Ethernet, serial port, etc.) implemented on the chassis manager 116, or by mapping the chassis manager 116 onto a predetermined computer blade occupying a blade server chassis slot '1' 206, '2' 208, '3' 210, '4' 212 or 'n' 214, that in turn is coupled to the blade server's mid-plane 204 such that its functionality can be accessed through the blade.

Figure 3:
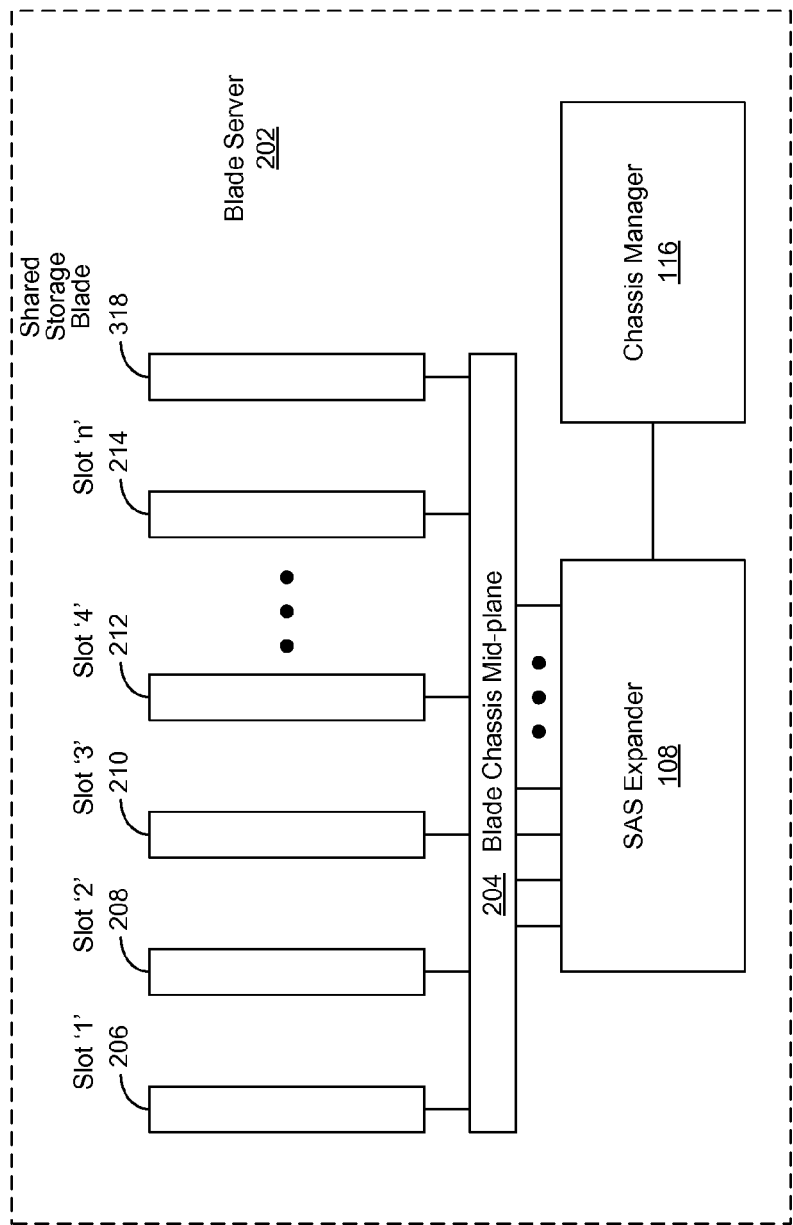
FIG. 3 is a generalized block diagram of a blade server implemented with internal shared storage in accordance with an embodiment of the invention.

FIG. 3 is a generalized block diagram of a blade server 202 implemented with internal shared storage 318 in accordance with an embodiment of the invention. Blade server 202 comprises blade chassis mid-plane 204, blade server chassis slots '1' 206, '2' 208, '3' 210, '4' 212 through 'n' 214, serial-attached small computer system interface (SAS) expander 108, chassis manager 116 and shared storage blade 318. Blade chassis mid-plane 204 transfers data, distributes power, and provides signal connectivity to couple one or more blade computers implemented on blade server chassis slots '1' 206, '2' 208, '3' 210, '4' 212 through 'n' 214, and shared storage blade 318 to SAS expander 108.

As implemented in different embodiments of the invention, chassis manager 116 is a processing entity implemented on blade chassis mid-plane 204 to provide, independently or in conjunction with other systems (e.g., SAS expander 108) and/or attached storage devices, management of internal shared storage blade 318. In an embodiment of the invention, internal shared storage blade 318 comprises a redundant array of independent disks (RAID) subsystem. Management of these resources includes, but is not limited to, creation of logical units, assignment of logical units to predetermined blade server chassis slots '1' 206, '2' 208, '3' 210, '4' 212 through 'n' 214, and deletion of logical units. Management commands are communicated via an interface (e.g., Ethernet, serial port, etc.) implemented on the chassis manager 116, or by mapping the chassis manager 116 onto a predetermined computer blade occupying a blade server chassis slot '1' 206, '2' 208, '3' 210, '4' 212 or 'n' 214, that in turn is coupled to the blade server's mid-plane 204, such that its functionality can be accessed through the blade.

FIGS. 4a-c depict shared storage resource masking information maintained by one or more storage devices implemented in accordance with an embodiment of the invention. FIG. 4a depicts storage device resource masking table 402 comprising columns for slot ID 404, assigned logical units 406 and blade ID 408. Shared storage resource assignment data is entered into each row of the table, beginning with Slot ID 'SAS Address 0,0' 410, followed by Slot ID 'SAS Address 0,2' 412, and continuing through Slot ID 'SAS Address n, m' 414 as described in greater detail hereinbelow.

FIG. 4b is a generalized flowchart illustrating the population of shared storage resource assignment data for slot ID 404 and assigned logical units 406 comprising storage device resource masking table 402. Assignment of shared storage resources begins in step 430, with a chassis manager assigning shared storage in step 432 to predetermined server chassis slot IDs. Once shared storage resources are assigned by a chassis manager in step 432, the associated storage device updates assignment data in step 434 for slot ID 404 and assigned logical units 406 comprising its internal resource masking table 402, after which updating of storage assignment data ends in step 436.

FIG. 4c is a generalized flowchart illustrating the population of shared storage resource assignment data for blade IDs 408 comprising storage device resource masking table 402. Assignment of shared storage resources begins in step 440, with a storage device receiving a serial management protocol (SMP) BROADCAST (CHANGE) notification in step 442. In response, the storage device executes an SMP DISCOVER command in step 444 to detect the unique WWN identifier of the computer blade that initiated the notification and the slot of the blade server chassis it occupies.

If it is determined in step 446 that a blade computer has been added, then the detected blade computer's ID (e.g., WWN identifier) 408, along with its associated blade server chassis slot ID 404 and assigned logical unit information 406, is used by the storage device in step 448 to update its storage device resource masking table 402, which will prevent other computer blades from viewing or accessing shared storage resources assigned to the slot. Once updating of storage device resource masking table 402 is completed in step 448, assignment of shared storage resources is ended in step 452. If it is determined in step 446 that a blade computer has been removed, then the missing blade computer's ID 408 (e.g., WWN identifier), its associated blade server chassis slot ID 404, and assigned logical unit information 406 are removed from storage device resource masking table 402 by the storage device in step 450. Once the missing blade computer's ID 408, its associated blade server chassis slot ID 404, and assigned logical unit information 406 are removed from storage device resource masking table 402, assignment of shared storage resources is ended in step 452.

Figures 5A, 5B, 5C, 5D:
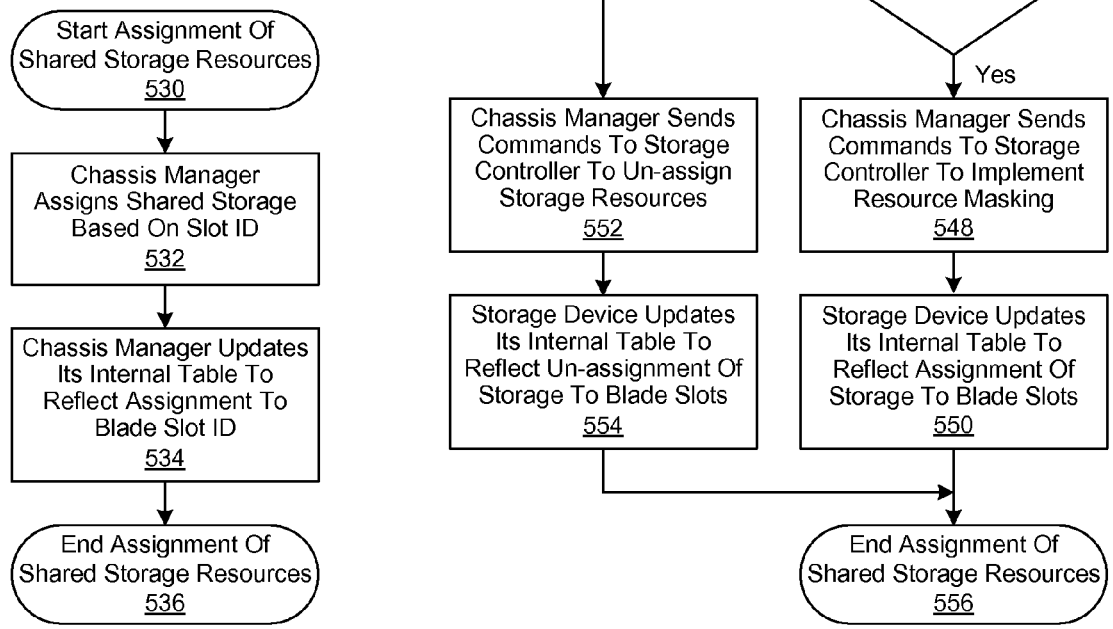
FIGS. 5a-d depict shared storage resource masking information maintained by a chassis manager and one or more storage devices as implemented in accordance with an embodiment of the invention.

FIGS. 5a-d depict shared storage resource masking information maintained by a chassis manager and one or more storage devices as implemented in accordance with an embodiment of the invention. FIG. 5a depicts chassis manager resource masking table 502 comprising columns for slot ID 504, and assigned logical units 506. Shared storage resource assignment data is entered into each row of the table, beginning with Slot ID 'SAS address 0,0' 510, followed by Slot ID 'SAS address 0,2' 512, and continuing through Slot ID 'SAS Address n, m' 514 as described in greater detail hereinabove.

FIG. 5b depicts storage device resource masking table 516 comprising columns for blade ID 518, and assigned logical units 520. Shared storage resource assignment data is entered into each row of the table, beginning with blade ID 'HSAS_ADDRa' 522, followed by blade ID 'HSAS_ADDRb' 524, and continuing thereafter as described in greater detail hereinbelow.

FIG. 5c is a generalized flowchart illustrating the population of shared storage resource assignment data for slot ID 504 and assigned logical units 506 comprising chassis manager resource masking table 502. Assignment of shared storage resources begins in step 530, with a chassis manager assigning shared storage in step 532 to predetermined server chassis slot IDs. Once shared storage resources are assigned by a chassis manager in step 532, it updates assignment data in step 534 for slot ID 504 and assigned logical units 506 comprising its internal resource masking table 502, after which updating of storage assignment data ends in step 536.

FIG. 5d is a generalized flowchart illustrating the population of shared storage resource assignment data for blade IDs 518 comprising storage device resource masking table 516. Assignment of shared storage resources begins in step 540, with a chassis manage receiving a Serial Management Protocol (SMP) BROADCAST (CHANGE) notification in step 542. In response, the chassis manager executes an SMP DISCOVER command in step 544 to detect the unique WWN identifier of the computer blade that initiated the notification and the slot of the blade server chassis it occupies.

If it is determined in step 546 that a blade computer has been added, then the chassis manager sends commands to the storage controller to implement resource masking in step 548. The detected blade computer's ID (e.g., WWN identifier) 518, and its associated assigned logical unit information 520, is used by the storage device in step 550 to update its storage device resource masking table 516, which will prevent other computer blades from viewing or accessing shared storage resources assigned to the slot. Once updating of storage device resource masking table 516 is completed in step 550, assignment of shared storage resources is ended in step 556. If it is determined in step 546 that a blade computer has been removed, then in step 552 the chassis manager removes its associated blade server chassis slot ID 504, and assigned logical unit information 506, from chassis manager resource masking table 502. The chassis manager then sends commands to the storage controller to un-assign storage resources by removing the missing blade computer's ID 518, and assigned logical unit information 520, from storage device resource masking table 516. Once updating of storage device resource masking table 516 is completed in step 554, assignment of shared storage resources is ended in step 556.

It will be apparent to those of skill in the art that shared storage resources are assigned in these embodiments of the invention to predetermined blade server slot addresses, not to a blade computer's unique WWN identifier. Furthermore, no host-based software is required to assign shared resources to a computer blade, only its presence in a predetermined slot of a blade server chassis. It will likewise be apparent to skilled practitioners of the art that the method and system of the invention can be implemented using other storage interconnect protocols that provide address-to-interconnect points. For example, when implemented with the Fibre Channel protocol, the chassis manager detects implementation of a computer blade through a Fibre Channel port with a registered state change notification (RSCN) from the Fibre Channel fabric, and then executes processes similar to those described in greater detail herein. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. A data storage system comprising:
    a plurality of data storage entities;
    at least one information handling system (IHS);
    at least one connector having a unique connector identifier, said connector being operable to transmit data between said plurality of data storage entities and said information handling system; and
    management logic operable to associate said plurality of data storage entities to define a shared data storage resource and to correlate said unique connector identifier with said shared data storage resource, thereby enabling transfer of data between said information handling system and said shared data storage resource.

2. The data storage system of claim 1, wherein said management logic is operable to create logical units.

3. The data storage system of claim 2, wherein said management logic is operable to assign logical units to predetermined connector identifiers.

4. The data storage system of claim 2, wherein said management logic is operable to delete logical units.

5. The data storage system of claim 1, wherein said information handling system further comprises a unique IHS identifier.

6. The data storage system of claim 5, wherein said management logic is further operable to associate said unique IHS identifier with said shared data resource.

7. The data storage system of claim 6, wherein said management logic is operable to use said unique connector identifier to assign a logical unit number to said connector.

8. The data storage system of claim 7, wherein said management logic is implemented on the mid-plane of a blade server chassis.

9. The data storage system of claim 7, wherein said management logic is implemented in a management information handling system operably connected to a blade server chassis.

10. The data storage system of claim 7, wherein said unique connector identifier comprises a unique serial-attached small computer system interface (SAS) phy identifier.

11. A method of allocating storage resources in a data storage system, comprising:
    providing a plurality of data storage entities;
    providing at least one connector having a unique connector identifier, said connector being operable to transmit data between said plurality of data storage entities and an information handling system; and
    using management logic to associate said plurality of data storage entities to define a shared data storage resource and to correlate said unique connector identifier with said shared data storage resource, thereby enabling transfer of data between said information handling system and said shared data storage resource.

12. The method of claim 11, further comprising:
    using said management logic to create logical units.

13. The method of claim 12, further comprising:
    using said management logic to assign logical units to predetermined connector identifiers.

14. The method of claim 12, further comprising:
    using said management logic to delete logical units.

15. The method of claim 11, wherein said information handling system further comprises a unique IHS identifier.

16. The method of claim 15, further comprising:
    using said management logic to associate said unique IHS identifier with said shared data resource.

17. The method of claim 16, further comprising:
    using said unique connector identifier to assign a logical unit number to said connector.

18. The method of claim 17, wherein said management logic is implemented on the mid-plane of a blade server chassis.

19. The method of claim 17, wherein said management logic is implemented in a management information handling system operably connected to a blade server chassis.

20. The method of claim 17, wherein said unique connector identifier comprises a unique serial-attached small computer system interface (SAS) phy identifier.

* * * * *